United States Patent [19]
Tamiya et al.

[11] Patent Number: 5,854,782
[45] Date of Patent: *Dec. 29, 1998

[54] MULTI-DISK PLAYER

[75] Inventors: Tadanori Tamiya; Takumi Oota, both of Tottori, Japan

[73] Assignees: Sanyo Electric Co. Ltd, Tottori; Tottori Sanyo Elec. Co. Ltd, Osaka-fu, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 556,213

[22] Filed: Nov. 9, 1995

[30]    Foreign Application Priority Data

Nov. 12, 1994 [JP] Japan .................................. 6-303121

[51] Int. Cl.⁶ ............................ G11B 17/22; G11B 17/04
[52] U.S. Cl. ............................................. 369/192; 369/38
[58] Field of Search ................................. 369/34, 36, 38, 369/39, 178, 191, 192, 193, 194, 179; 360/98.04, 98.06

[56]               References Cited

U.S. PATENT DOCUMENTS

| 5,123,000 | 6/1992 | Fitzgerald et al. | 369/191 |
| 5,228,016 | 7/1993 | Menke | 369/36 |
| 5,247,500 | 9/1993 | Miyoshi et al. | 369/38 |
| 5,377,174 | 12/1994 | Nakagawa et al. | 369/38 |
| 5,414,679 | 5/1995 | Menke | 369/191 |
| 5,532,985 | 7/1996 | Nakamichi | 369/191 |

*Primary Examiner*—David L. Ometz
*Attorney, Agent, or Firm*—Darby & Darby

[57]                 ABSTRACT

A multi-disk player has a magazine 1 having a plurality of trays 12 stacked in a case 13 one above the other on each of which a disk 11 is to be respectively mounted, a magazine containing portion 2 where the magazine 1 is inserted and pulled out, a recording and/or playing portion 3 arranged to be aligned with the magazine containing portion 2 in a direction where the magazine is inserted and pulled out, an elevator mechanism 4 which adjusts relative up-and-down locations of the recording and/or playing portion 3 and a tray 12, and a loading mechanism 6 which reciprocates the selected disk between the magazine 1 contained in the magazine containing portion 2 and the recording and/or playing portion 3. The loading mechanism 6 has a hook 61 which engages with a engaging portion 12a of a selected tray 12 in the magazine 1 contained in the magazine containing portion 2, a driving means for movements between a locking position and a shunting position for selectively moving the hook 61 to the locking position in which the hook 61 engages with the engaging portion 12a of the tray 12 or to the shunting position in which the hook 61 does not engage with the engaging portion 12a, and driving means which straightly reciprocates the hook 61 between the locking position and a position in which the disk to be loaded.

7 Claims, 11 Drawing Sheets

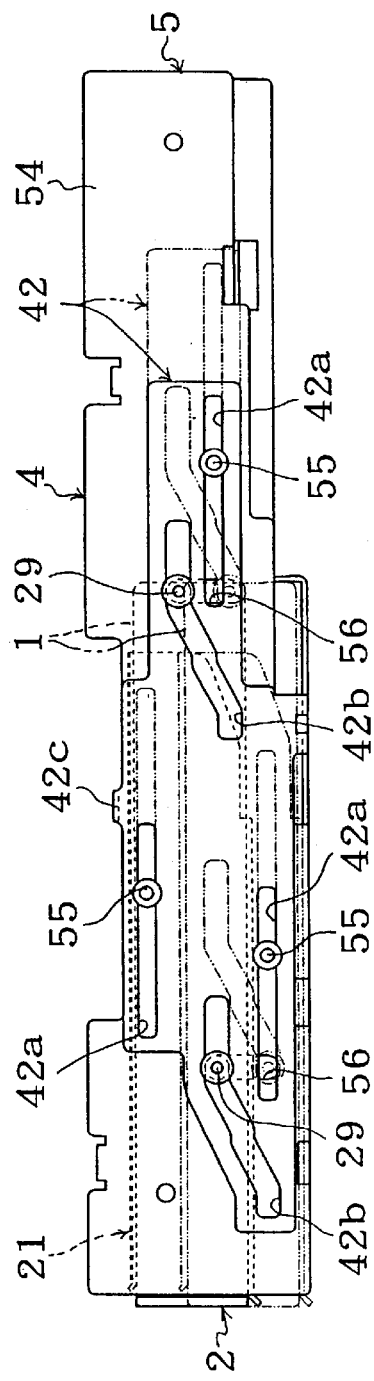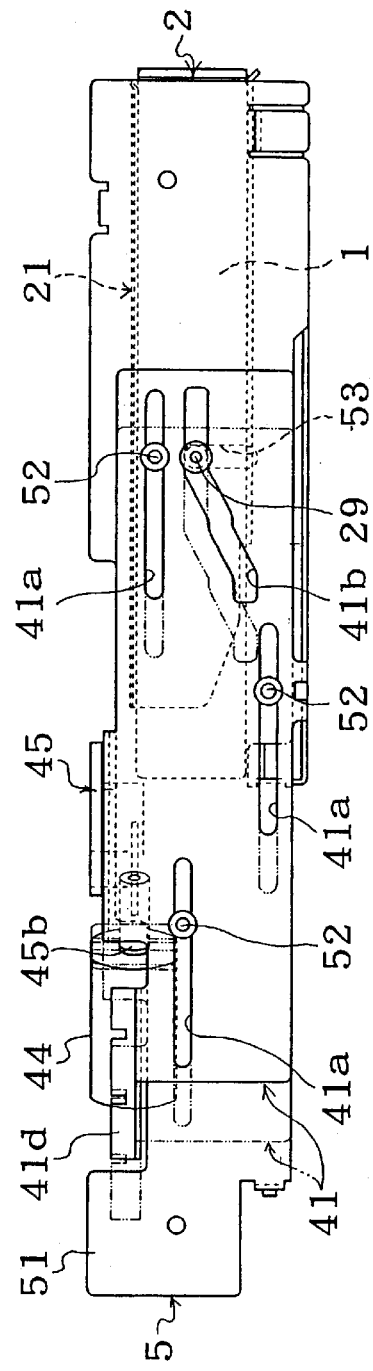

MULTI-DISK PLAYER

BACKGROUND OF THE INVENTION

The present invention relates to a multi-disk player, especially one in which loading and unloading of a disk into and form a recording and/or playing portion are made possible by straightly reciprocating the disk, in the same direction in which a magazine is inserted and pulled out.

DESCRIPTION OF THE PRIOR ART

A multi-disk player generally means a recording and/or playing device comprising a plurality of disks in which one of the disks is selected at random for playing or for playing and recording (hereinafter simply referred to as recording and/or playing).

As shown in U.S. Pat. No. 5,046,059 (Japanese Patent Laid-Open Gazette No. 522513/1989), for example, a multi-disk player may have a magazine in which a plurality of trays are stacked in a case one above the other, a disk respectively mounted on each tray and one of the disks being selected at random for recording and/or playing.

The above-described multi-disk player comprises a magazine containing portion where a magazine is inserted and pulled out, a recording and/or playing portion (a player body) arranged to be aligned with the magazine containing portion in the direction where the magazine is inserted and pulled out, an elevator mechanism which moves the magazine containing portio up and down corresponding to the recording and/or playing portion, and a loading mechanism which reciprocates the selected disk between the magazine contained in the magazine contained portion and the recording and/or playing portion.

Each try in the magazine is supported by a pin on a left front (or right front) part of the magazine, which pin is rotatable around a longitudinal axis. Furthermore, the loading mechanism comprises a hook which engages from the back a rear section of the selected tray in the magazine contained in the magazine containing portion, and a rotary driving device which rotates the hook by approximately 90°.

In above-described multi-disk player, the magazine containing portion is moved up and down corresponding to the recording and/or playing portion by operating the elevator mechanism after inserting the magazine into the magazine containing portion. Any selected tray is moved to a height of the hook through the up-and-down movement. Accordingly the selected tray is engaged with the hook.

Then the tray is rotated by 90° following rotation of the hook by 90° so as to move the try to a predetermined position in the recording and/or playing portion. Accordingly, the tray is moved back from the position to the magazine by rotating the hook by 90° in the opposite direction.

The multi-disk player in which the try rotates by 90°, thus, has a problem that the pace required for movement of the tray is larger than width of the magazine in the lateral direction.

It can be devices for resolving the problem to load a selected tray in a magazine contained in a magazine containing portion of a multi-disk player by straightly moving the tray backward to a recording and/or playing portion formed behind the magazine and to unload the tray by straightly moving the tray forward from the recording and/or playing portion top the magazine in order to make small the lateral width of the space required for movement of the disk (tray). In such a player, however, the following problem was found to occur.

It is necessary, in a multi-disk player, to provide a hook which engages with a tray both from the front and the rear, and an engaging portion on the tray for receiving the hook from the front or the rear for moving a disk in the direction that a magazine in inserted and pulled out (that is both in the back and forth direction). If the hook and the engaging portion are simply provided, however, the hook strikes against rear surface of the magazine and prevents it from getting in, when the magazine is inserted.

It is preferable for resolving the problem that the engaging portion pushes away the hook out of the space for movement of the engaging portion, when the magazine is inserted, and the hook is automatically returned , e.g. by an elastic body, after the engaging portion gets over the hook, in order to make the hook accept the engaging portion from the front.

In above case, however, another problem occurs that the tray is left in the multi-disk player when the magazine is pulled out, because the hook hangs over the tray.

SUMMARY OF THE INVENTION

Considering above-described conditions, the object of the present invention is to supply a multi-disk player with a structure such that a disk can be loaded into and unloaded out of a recording and/or playing portion by straightly reciprocating the disk in the same direction that a magazine is inserted and pulled out.

A multi-disk player of the present invention is characterized by (i) a magazine having a plurality of trays stacked in a case one above the other and on each of which there is a disk to be respectively mounted, (ii) a magazine containing portion where the magazine is inserted and pulled out, (iii) a recording and/or playing portion arranged to be aligned with the magazine containing portion in the direction in which the magazine is inserted and pulled out, (iv) an elevator mechanism which adjusts the relative up-and-down locations of the recording and/or playing portion and a tray, (v) a loading mechanism which comprises a hook which engages with an engaging portion of a selected tray in the magazine contained in the magazine containing portion for reciprocating the selected disk between the magazine contained in the magazine containing portion and the recording and/or playing portion (vi) a driving means for treating movements between a locking position and a shunting position, which driving means selectively moves the hook to the locking position in which the hook engages with the engaging portion few the tray or the shunting position in which the hook does not engage with the engaging portion, and (vii) a driving means making a straight line drive which straightly reciprocates the hook between the locking position and a position in which the disk is to be loaded.

In a multi-disk player having the above-described construction, a hook is placed in a locking position by a driving means for causing movements between a locking position and a shunting position, and engages with a engaging portion of a tray, when any selected tray is moved from a magazine containing portion to a loading position in a recording and/or playing portion.

The selected tray is pulled out of a magazine and moved into the loading position by moving the hook in a straight line toward the recording and/or playing portion. when the hook is moved straight toward the magazine, on the other hand, the tray is pulled out of the loading position and moved back to the magazine.

After that the tray is brought back into the magazine, the hook is moved to the shunting position by the driving means for movements between the locking position and the shunting position. By moving the hook to the shunting position, the tray can be pulled out of a magazine containing portion together with a case of the magazine without a risk of being interrupted by the hook.

In such a construction, the magazine can be inserted without obstruction by shunting the hook into an upper (or a lower) position than that of the uppermost (or the lowermost) one of the plurality of trays stacked one above the other. In other words, the shunting position can be arranged in an upper (or a lower) position than the locking position. Describing more in detail, the shunting position can be arranged in an upper (or a lower) position than the locking position by extending the range of up-and-down movement of the magazine containing portion (or the recording and/or playing portion) which is moved with the elevator mechanism, by a thickness of only one tray.

However, a space for shunting the hook must be built in the direction of this thickness of the multi-disk player for shunting the hook in an upper or a lower position of the uppermost or lowermost tray, whereby the multi-disk player would be thicker.

It is therefore more preferable to arrange the shunting position on a side of the locking position. When the shunting position is arranged on a side of the locking position, the driving means for movements between the locking position and the shunting position can be constructed comprising a projection provided on the hook and a first guiding groove which guides the projection between the locking position and the shunting position on a side thereof. Also, the driving means for making a straight drive can be constructed comprising the projection on the hook and a second guiding groove which guides the projection between the locking position and a position in which the disk to be loaded, and connects to the first guiding groove.

The loading mechanism may as well be constructed to reciprocate a selected disk by a distance less than the diameter of the disk between the magazine contained in the magazine containing portion and the recording and/or playing portion. In such a construction, the multidisk player can be miniaturized compared to one of another construction in which the distance of a disk corresponds to the diameter of the disk.

Furthermore, in the above construction in which a disk waiting in the magazine and a disk being played are overlapped, a portion of the tray which is positioned above a disk moved into the recording and/or playing portion, may as well be cut away in a semi-circular shape. Hereby the thickness of the whole body of the multi-disk player can be made thinner,m because the magazine is made thinner by making a space containing disks thinner.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a right side view of the multi-disk player according to the present invention;

FIG. 7 is a left side view of the multi-disk player according to the present invention;

DESCRIPTION OF THE PREFERRED EMBODIMENTS

Description is now made of a multi-disk player according to one embodiment of the present invention with reference to the drawings.

As principle mechanical matters of the multi-disk player, insertion of a magazine, selection of a disk, eject of a magazine, loading of a disk, recording and/or playing a disk, and unloading of a disk should be mentioned. Hereinafter, construction of the multi-disk player will be described in connection with said principles in order. (Insertion of a magazine)

Figure 1:
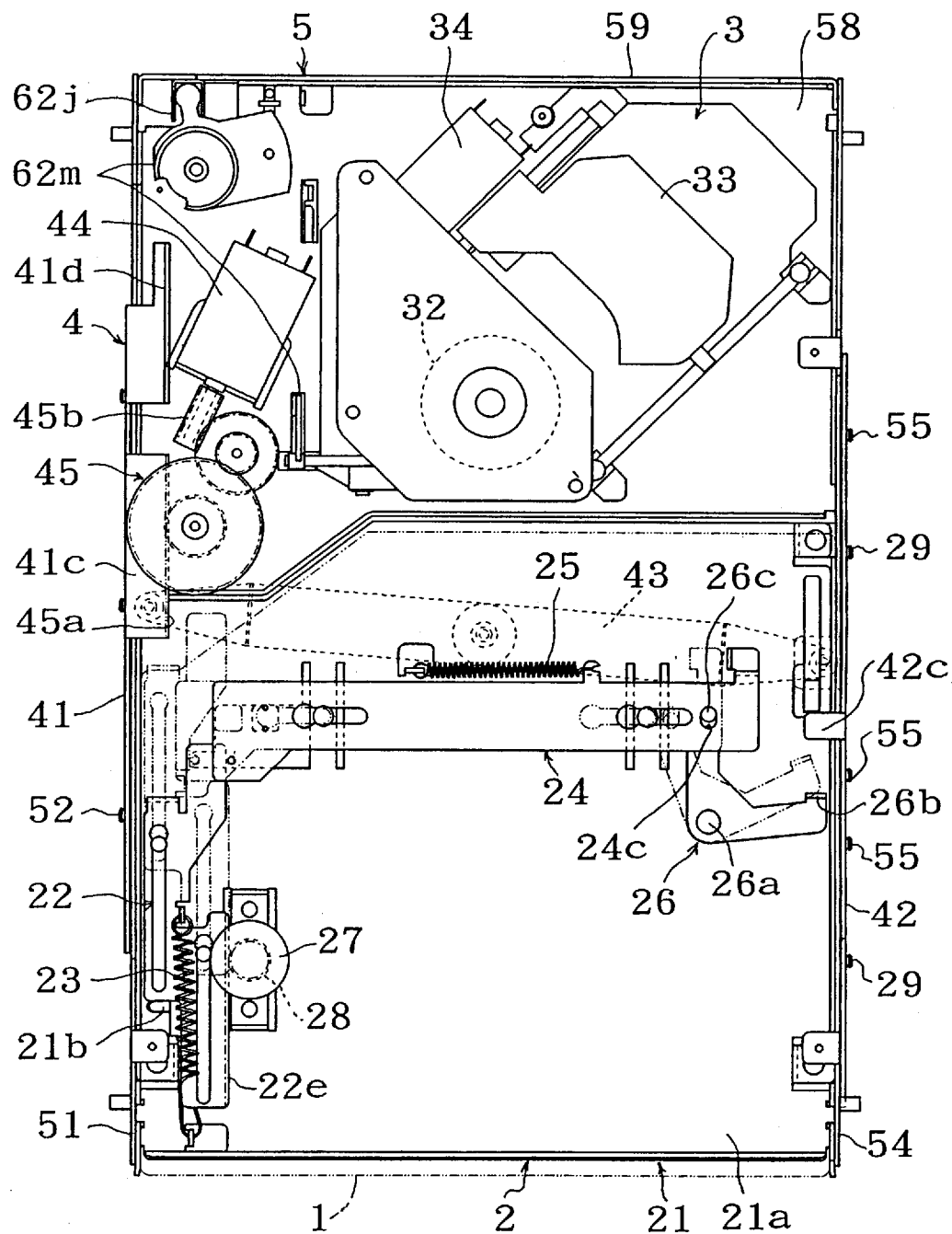
FIG. 1 is a plan view of a multi-disk player according to the present invention.

As illustrated in FIG. 1, a magazine containing portion 2 where a magazine 1 is inserted and pulled out is provided on a front part of the multi-disk player. if a user inserts the magazine 1 deep enough into the magazine containing portion 2, the magazine 1 is fixed in a position indicated with two-dot and dash line in FIG. 1.

A containing portion body 21 of the magazine containing portion 2 is formed in the shape of a flat square barrel whose front and rear surfaces are open. On upper left side of an upper wall 21a of the containing portion body 21, a longitudinal slider 22 having the shape of a longitudinally long plate is movably supported in the front and rear direction.

Figure 2:
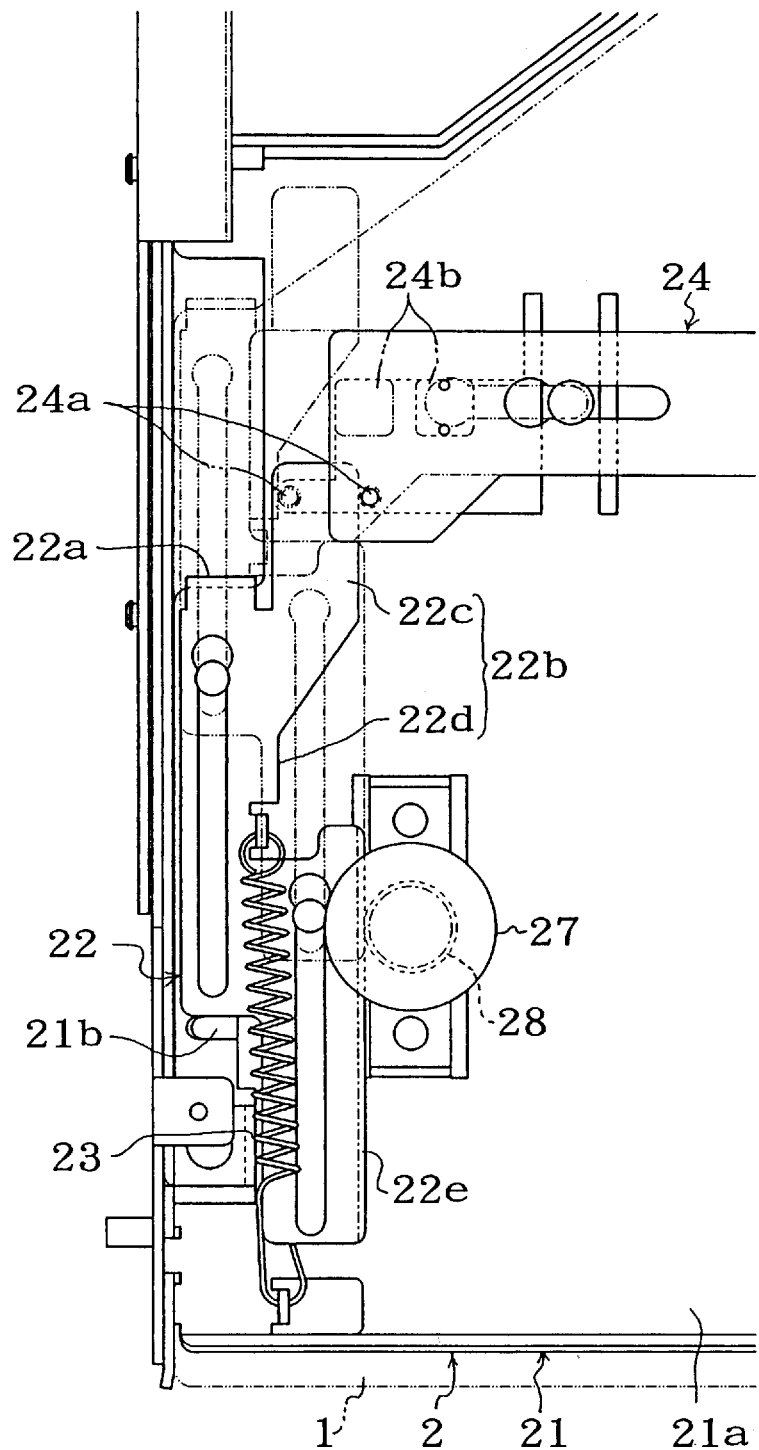
FIG. 2 is a plan view of the principle part of a magazine containing portion of the multi-disk player according to the present invention.

As illustrated in FIG. 2, the longitudinal slider 22 is urged forward by eject spring 23. An the forward movement of the longitudinal slider 22 is restricted by a stopper 21b. the stopper 21b is formed by turning up a part of the upper wall 21a.

An edge of the rear left end the longitudinal slider 22 is turned downward. Hereinafter the part turned downward will be referred to as a receiving portion 22a. The receiving portion 22a receives rear left part of the magazine 1 which is inserted from the front side into a position at a predetermined depth in the containing portion body 21. The magazine 1 is furthermore pushed against the eject spring 23 into a mounting position even after the receiving portion 22a receives the left rear part thereof.

As illustrated in FIG. 1, a lateral slider 24 having the shape of a laterally long plate is supported slidably at its right and left sides on the rear part of the containing portion body 21. The lateral slider 24 is urged leftward by a lock spring 25.

As illustrated in FIG. 2, a step cam 22b is formed on an edge rear at the right side of the longitudinal slider 22. The step cam 22b projects in the shape of a step which rises rightward from rear side of the longitudinal slider 22. On lower surface of the left end of the lateral slider 24, a pin 24a is provided therefrom, which pin is received by the step cam 22b, and a locking portion 24b is formed projecting so as to reach downward from the upper wall 21a of the containing portion body 21.

Figure 3:
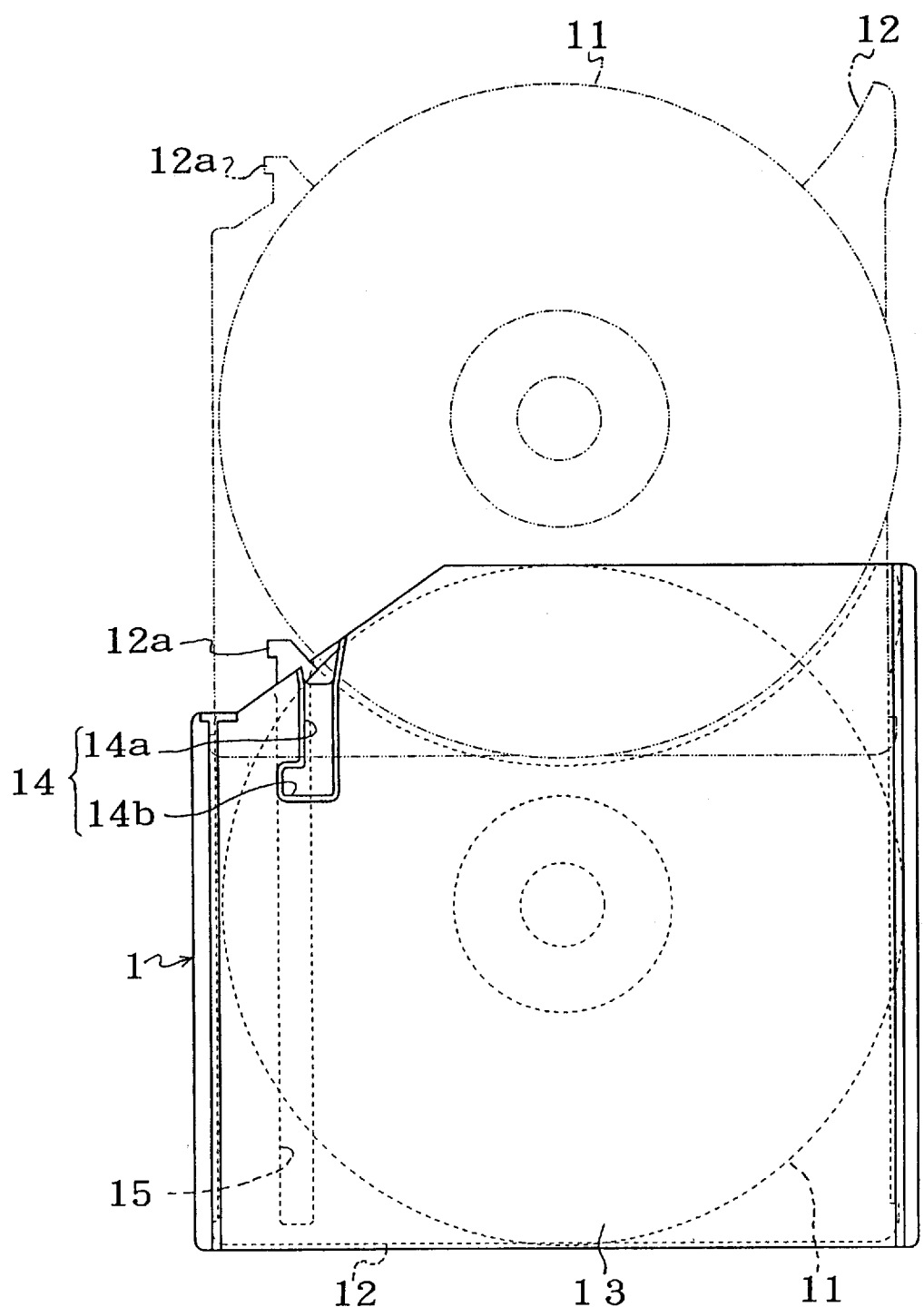
FIG. 3 is a plan view of a magazine of the multi-disk player according to the present invention.
Figure 4:
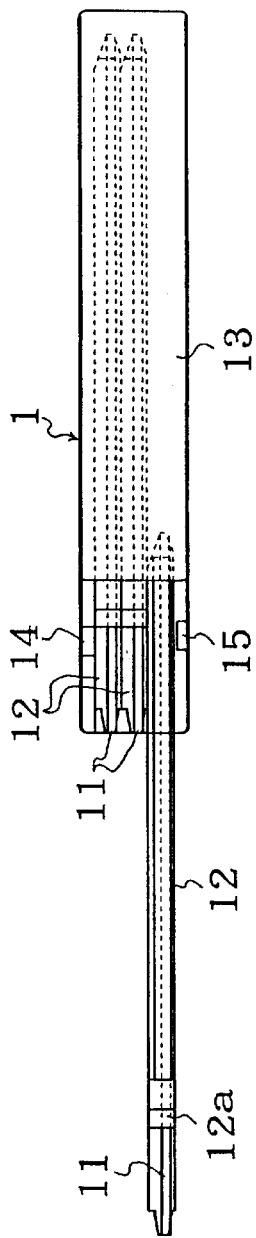
FIG. 4 is a left side view of the magazine of the present invention according to the present invention.

As illustrated in FIGS. 3 and 4, the magazine 1 comprises a plurality of trays 12 and a case 13. On each tray 12, a disk 11 can be respectively mounted. Furthermore, each tray 12 has a notch 12a formed by cutting away a portion of the tray, which is positioned above a disk 11 moved into the recording and/or playing portion 3, in a semi-circular shape. The disk 11 moved into the recording and/or playing portion is a little lifted up when it is to be played (rotated). When the disk 11 is lifted up, contact of the disk 11 with the tray 12 in the magazine 1 must be avoided. Having the notch 121, the "contact" can be avoided, and furthermore, space for containing the disk 11 can be made thinner, which leads to making the magazine 1, and accordingly the whole body of the multi-disk player, thinner.

The case 13 is in the shape of a rectangular parallelepipeds box open in the back, which contains a plurality of trays stacked one above the other and slidable i the front and rear directions.

A locking groove 14 comprising a longitudinal groove 14a and a lateral groove 14b is formed on upper surface of the case 13. in a plain view, the longitudinal groove 14a extends forward from rear edge of the case 13. The lateral groove 14b extends leftward being connected with front end of the longitudinal groove 14a. When the magazine 1 is inserted into the magazine containing portion 2 from the front, the locking portion 24b of the magazine containing portion 2 fits in the longitudinal groove 14a from the back.

While the locking option 24b moves ahead in the longitudinal groove 14a, the lateral slider 24 cannot move either rightward or leftward. The locking portion 24b is brought to the position where it is allowed to move toward the lateral groove 14b only when it reaches front end portion of the longitudinal groove 14a.

As shown in FIG. 2, the locking portion 24b can bit in the longitudinal groove 14a when the step cam 22b of the longitudinal slider 22 moves backward. In other words, as indicated with two-dot and dash line in FIG. 2, a right step portion 22c which is projected rightward moves out of the place to behind the pin 24a of the lateral slider 24, when the step cam 22b of the longitudinal slider 22 moves backward. Accordingly, left step portion 22d which has waited in the left position leaves the pin 24a at a distance for being opposed thereto before the locking portion 24b reaches the front end portion of the longitudinal groove 14a.

The lock spring 24 moves the lateral slider 24 leftward synchronizing with that the locking portion 24b reaching the front end portion of the longitudinal groove 14a when it is allowed to move leftward along the lateral groove 14b. The lateral groove 14b engages with the locking portion 24b through the movement of the lateral slider 24, which restricts forward and backward movement of the magazine 1. Accordingly the magazine 1 is fixed in the magazine containing portion 2.

Furthermore, a guiding groove 15 (FIG. 3) is formed on a bottom surface of the magazine 1 and projects forward from rear edge thereof. A guiding projection which is not illustrated is also formed on the upper surface of the bottom wall of the magazine containing portion 2, corresponding to the guiding groove 15. The magazine 1 is restricted in its rightward and leftward movement by a connection of the guiding projection with the guiding groove 15. Moreover the upper wall 21a and a lower wall of the containing portion body 21 restrict up-and-down movement of the magazine 1.

(Selection of a Disk)

A user can give a selection instruction (for selection of music) to specify a disk or a recording area to be recorded and/or played before or after inserting the magazine 1 into the magazine containing portion 2.

When above selection instruction is given, it is confirmed whether the magazine 1 has been inserted into the magazine containing portion 2 or not. If the magazine 1 is confirmed to be inserted, the elevator mechanism 4 operates, according to the selection instruction, to move the magazine containing portion 2 up and down. Any selected disk 11 in the magazine 1 contained in the magazine containing portion 2 is taken to a position corresponding to the recording and/or playing portion 3 through the elevator movement, which means that a disk 11 to be recorded and/or played is selected.

The elevator mechanism 4 is only for up-and-down movement of the magazine containing portion 2 within a predetermined range and stopping it at a predetermined position in the range. Therefore, a motor-driven screw jack, a pantograph mechanism, a lever and/or link mechanism, a cam, a solenoid, a linear motion or the like can be utilized as the elevator mechanism 4.

According to this embodiment, an elevator mechanism 4 using a cam plate is employed, which mechanism is of advantage in miniaturization and simplification of the construction of the multi-disk player.

The elevator mechanism 4 (FIG. 1) therefore comprises (i) right and left sliding cam plates 41 and 42 slidably supported on both the right and left sides of the chassis 5 in the front and rear direction, (ii) an interlocking beam 43 which interlocks the right and left sliding cam plates 41 and 42 so as to move them in opposer, a motor 44, and a reduction transmission mechanism 45 which transmits driving force from the motor 44 to the left sliding cam plate 41.

Although an ordinary motor is used as the motor 44, it is also possible to use a stepping motor or the like which can precisely control rotary phase.

Furthermore, the reduction transmission mechanism 45 is used only for transmitting driving force from the motor 44 to the left sliding cam plate 41. Therefore, various well-known transmission mechanisms can be employed, for example, friction transmission mechanisms such as a belt type transmission mechanism, and a friction wheel type transmission mechanism, a chain type transmission mechanism, and a gear type transmission mechanism (gear train).

According to this embodiment, the upper edge section of the left sliding cam plate 41 is turned rightward by a predetermined angle, from the middle to the rear part in the front and rear direction, and the transmission mechanism 45 comprises a lack gear 45a formed on right side edge of the turned portion 41c and a reduction gear train between the turned portion 41c and the screw gear 45b which is directly connected with the motor 44. The above described construction is the most advantageous with respect to miniaturization of the space occupied and the development of high mechanical efficiency and accuracy of control.

Figure 5:
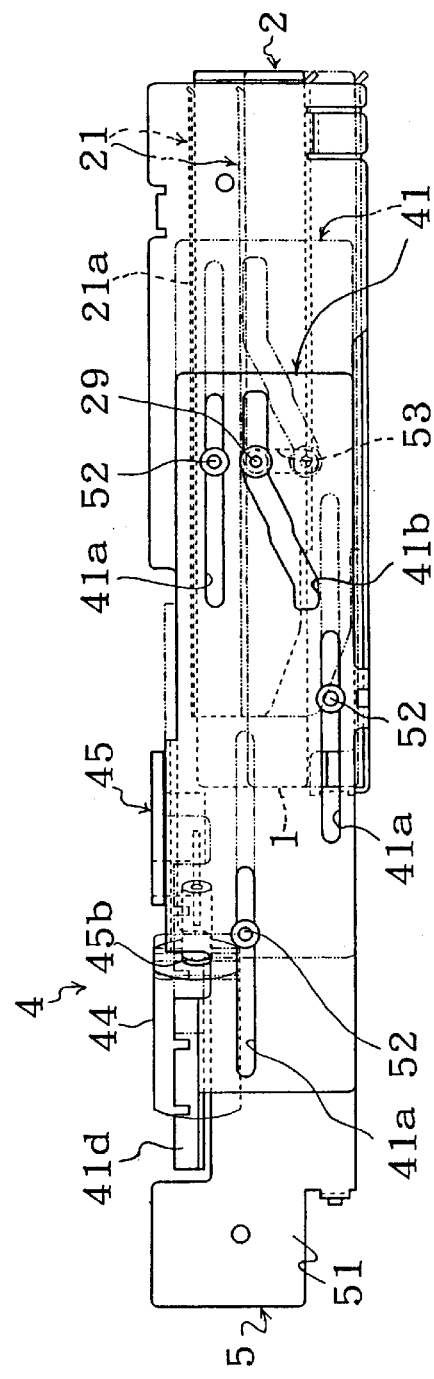
FIG. 5 is a left side view of the multi-disk player according to the present invention.

As illustrated in FIGS. 5 and 7, three slide guiding grooves 41a, each being an elongated hole which is longer in the front and rear direction, and a cam groove 41b having the shape of a step which rises forward, are formed on the left sliding cam plate 41.

A guiding pin 52 fixed on left side wall of the chassis 5 is slidably fit in each slide guiding groove 41a, whereby the left sliding cam plate 41 can be moved forward and backward without up-and-down movement.

A connection pin 29 projecting leftward from the left end surface of the containing portion body 21 of the magazine containing portion 2 is slidably fit in the cam groove 41b. Moreover, the connection pin 29 is slidably fit in an up-and-down guiding groove 53 which is an elongated hole being longer in the front and rear direction formed on left side wall 51 of the chassis 5.

When the left sliding cam plate 41 is moved from its initial position indicated with solid line in FIG. 5 to its foremost position indicated with two-dot and dash line in FIG. 5, the magazine containing portion 2 moves down from its initial position indicated with dotted line to its lowermost position indicated with two-dot and dash line without moving in the front and rear direction. And when the magazine 1 reaches its lowermost position, an uppermost disk 11 in the magazine 1 is to be selected.

Furthermore, when the left sliding cam plate 41 is moved to a middle position between the initial position and the foremost position, the connection pin 29 moves to a height which is in the middle of the up-and-down guiding groove 53, and the magazine containing portion 2 is positioned in the middle between the initial position and the lowermost position, whereby a middle disk 11 is to be selected.

Still when the left sliding cam plate 41 is in the initial position, the magazine containing portion 2 is in the initial position which is the uppermost, whereby the lowermost disk 11 is to be selected.

Figure 8:
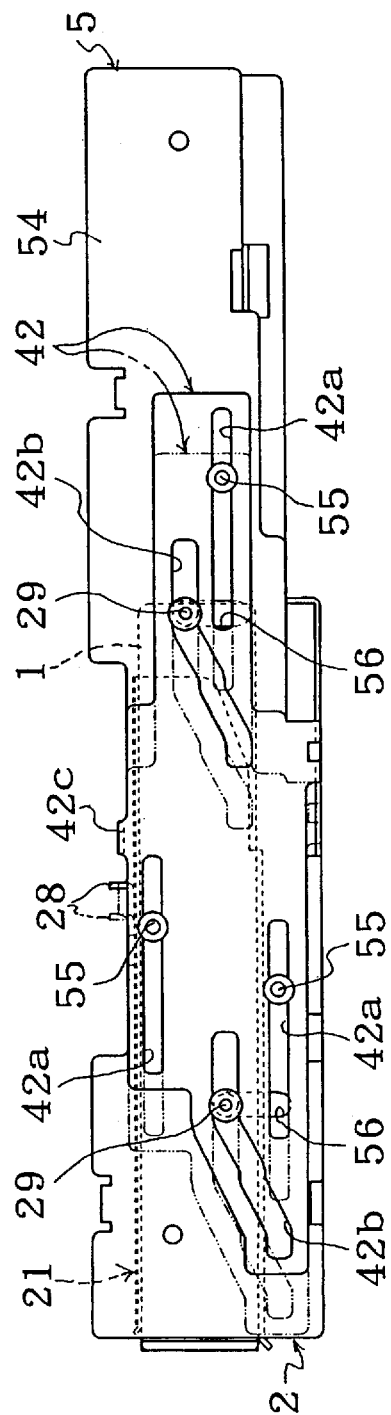
FIG. 8 is a right side view of the multi-disk player according to the present invention.

As illustrated in FIGS. 6 and 8, three slide guiding grooves 42a each being an elongated hole which is longer in the front and rear direction and two cam grooves 42b, which are in the shape of steps which rise toward the rear, are formed on right sliding cam plate 42.

A guiding pin 55 fixed on right side wall of the chassis 5 is slidably fit in each slide guiding groove 42a, which makes it possible for the right sliding cam plate 42 to move forward and backward without up-and-down movement.

A connection pin 29 projecting rightward from the right end surface of the magazine containing portion 2 is fit in each cam groove 42b. Each connection pin 29 is slidably fit in the up-and-down guiding groove 56 formed on right side wall 54 of the chassis 5 and being an elongated hole which is longer in the front and rear direction.

When the right sliding cam 42 is moved backward from its initial position indicated with solid line in FIG. 6 to its rearmost position indicated with two-dot and dash line in FIG. 6, the magazine containing portion 2 moves down from its initial position indicated with dotted line to its lowermost position indicated with two-dot and dash line without moving in the front and rear direction, and an uppermost disk 11 is to be selected.

Furthermore, when the right sliding cam plate 42 is moved to the middle position between the initial position and the foremost position, the connection pin 29 moves to a height which is in the middle of the up and down guiding groove 56, the magazine containing portion 2 is positioned in the middle between the initial position and the lowermost position, and a middle disk 11 is to be selected.

Still when the right sliding cam plate 42 is in the initial position, the magazine containing portion 2 is also in the initial position which is the uppermost, and a lowermost disk 11 is to be selected.

Since the right and left sliding cam plates 41 and 42 are interlocked by the interlocking beam 43 so as to move in opposite directions to each other, both the right and left side of the magazine containing portion 2 synchronizingly move up and down, whereby each disk 11 and each tray 12 in the magazine 1 mounted on the magazine containing portion 2 moves up and down while being horizontally held.

When selection of the disk 11 is finished, a loading instruction is automatically given by which a loading mechanism 6 which will be described later starts to pull out the tray 12 supporting the selected disk 11, and the disk 11 is put into a loading position in the recording and/or playing portion 3.

In case of the elevator mechanism 4, a photointerruptor type position sensor (not illustrated), which detects the positions of the right and left sliding cam plates 41 and 42, is provided on the upper rear part of the recording and/or playing portion 3. A slit plate 41d is formed by turning the upper edge of the rear end section of the left sliding cam plate 41. The slit plate 41d opens and closes an optical path of the position sensor through movement of the left sliding cam plate 41.

On the basis of the position data output by the position sensor, the position of the left sliding cam plate 41 is feedback controlled, whereby positions of the right and left sliding cam plates 41 and 42 are controlled.

According to this embodiment, both right and left sliding cam plates 41 and 42 and the magazine containing portion 2 are interlocked with three connection pins 29 to prevent the magazine containing portion 2 from rotating around an axis which is horizontal in the right and left directions. If another means to prevent the magazine containing portion 2 from rotating around the axis, which is horizontal in the right and left directions, is provided, the right and left sliding cam plates 41 and 42 and the magazine containing portion 2 may as well be interlocked with two connecting pins 29, one for the right and left sliding cam plates 41 and 42, and another for the magazine containing portion 2.

Another possible construction is such that more than two connection pins 29 are provided on both the right and left sides of the magazine containing portion 2 at proper intervals in the front and rear and/or up-and-down directions, respectively the same number of cam grooves 41b and 42b as that of the connection pin 29, are formed on each of the right and left sliding cam plates 41 and 42, and respectively the same number of up and down guiding grooves 53 and 56 as that of the connection pins 29 are provided on both the right and left side walls 51 and 54 of the chassis 5.

Although three slide guiding grooves 41a and 42a are formed on each of the right and left sliding cam plates 41 and 42, and each are supported on both the right and left side walls 51 and 54 of the chassis 5, respectively, through the three guiding pins 52 and 55, according to this embodiment, several guiding pins 52 and 55 are enough if the right and left sliding cam plates 41 and 42 are prevented from rotating around the axis which is horizontal in the right and left directions.

In other words it is also possible that two slide guiding grooves 41a and 42a are formed on each of the right and left sliding cam plates 41 and 42 which are supported on both the right and left side walls of the chassis 5, respectively, through two guiding pins 51 and 54.

Furthermore, it is still possible that more than four slide guiding pins 41a and 42a are formed on each of the right and left sliding cam plates 41 and 42 which are supported on both the right and left side walls of the chassis 5 through more than four guiding pins 52 and 55.

According to this embodiment, the magazine 1 and the magazine containing portion 2 are moved up and down to select a disk 11, because the number of disks 11 is small. If the number of disks 11 is large (for example, more than five disks 11 and trays 12 are contained in the magazine 1), however, the recording and/or playing portion 3 can be moved up and down by an elevator mechanism having the same construction as the elevator mechanism 4 in order to select one of the disks 11.

(Ejection of the Magazine)

When the magazine 1 is inserted into the magazine containing portion 2, a user can give an eject instruction to pull the magazine 1 out of the magazine containing portion 2.

If the eject instruction is given during recording and/or playing of any disk 11, the recording and/or playing operation is stopped, and then the disk 11 and a tray 12 which supports the disk 11 are brought back into the magazine 1 from the recording and/or playing portion 3 by the loading mechanism 6 which will be described later.

After that all disks 11 and trays 12 are confirmed to be contained in the magazine 1, the elevator mechanism 4 is operated to return the magazine 1 and the magazine containing portion 2 to their respective initial positions.

Furthermore, the lateral slide 24 is moved rightward by the motor 44 after confirming that the magazine 1 and the magazine containing portion 2 have returned to their respective initial positions. Accordingly, engagement of the locking portion 24b with the lateral groove 14b of the case 13 is released, whereby the magazine 1 is ejected toward the front of the magazine containing portion 2 due to the tension of the eject spring 23.

Now a description is given of a rightward movement of the lateral slider 24 by the motor 44. The left sliding cam plate 41 and the right sliding cam plate 42 are moved through operation of the motor 44.

The front end portion of the cam groove 41b of the left sliding cam plate 41 extends forward by a predetermined length, whereby the left sliding cam plate 41 can be moved from its initial position indicated with solid line in FIG. 7 to a backward ejecting position indicated with a two-dot and dash line in FIG. 7.

On the other hand, the rear end portion of each cam groove 42b of the right sliding cam plate 42 extends backward by a predetermined length, whereby the right sliding cam plate 42 can be moved from its initial position indicated with solid line in FIG. 8 to a forward ejecting position indicated with a two-dot and dash line in FIG. 8.

An L-shaped unlocking lever 26 (FIG. 1) comprising two arms is arranged on the rear right side of the upper wall 21a of the magazine containing portion 2. A fulcrum pin 26a supported on the upper wall 21a is fit into the crossing point of the two arms. The unlocking lever 26 rotates around the fulcrum pin 26a (longitudinal axis).

A section having a point of power 26b is provided on a tip of one arm which extends rightward from the crossing point on the unlocking lever 26. Also, a top of another arm which extends rearward from the crossing point supports an action pin 26c. The portion having a point of power 26b is positioned on the front side of an ejecting claw 42c. The ejecting claw 42c is formed by bending over to the right the upper edge of the middle section in the front and rear direction of the right sliding cam plate 42. And the action pin 26c is slidably and rotatably engaged with the engaging groove 24c which is an elongated hole is longer in the front and rear direction and is formed on the right end section of the lateral slider 24.

When the magazine 1 is pulled out of the magazine containing portion 2, it must be confirmed that all trays 12 are contained in the case 13 of the magazine 1, and the magazine 1 and the magazine containing portion 2 are in their respective initial positions. Afterwards, both the right and left sliding cam plates 41 and 42 are moved from the initial positions to the ejecting positions through the operation of the motor 44.

When the right sliding plate 42 is moved from the initial position to the ejecting position, the ejecting claw 42c pushes the section having a point a power 26b, which is on the unlocking lever 26, to the front, whereby the unlocking lever 26 moves from the locking position indicated with two-dot and dash line in FIG. 1 to the releasing position indicated with solid line in FIG. 1. The lateral slider 24 moves rightward from a locking position indicated with a two-dot and dash line in FIG. 1 to a releasing position indicated with a solid line in FIG. 1 through the movement of the unlocking lever 26. Accordingly, the locking portion 24b (see FIG. 2) moves from the innermost of the lateral groove 14b of the case 13 (see FIG. 3) to a connection point of the longitudinal groove 14a with the lateral groove 14b.

Due to the above movements, restrictions on the forward movement of the magazine 1, which is placed by engagement of the locking portion 24b and the lateral groove 14b, is released and the magazine 1 is pushed forward by the receiving portion 22a of the longitudinal slider 22. The eject spring 23 supplies the power to push it. At the same time, a right step portion 22c of the step cam 22b receives the pin 24a of the lateral slider 24.

According to this embodiment, stopper 21b restricts the range of forward movement of the longitudinal slider 22 when the magazine is ejected. And rotary type oil damper 27 is provided on the upper wall 21a so that the stopper 21b softly receives the longitudinal slider 22. In other words, the rack gear 22e formed on an edge of right front section of the longitudinal slider 22 is engaged with a pinion gear 28 which is directly connected with the oil damper 27.

The right and left sliding cam plates 41 and 42 are brought back to their respective initial positions immediately after that the magazine 1 is ejected from front of the magazine containing portion 2, whereby the restriction on the backward movement of the section having a power point 26b of the unlocking lever 26 is released.

When the restriction on backward movement of the section having a point of power 26b of the unlocking lever 26 is released, the lateral slider 24 and the unlocking lever 26 are held in releasing position, because the right step portion 22c of the step cam 22b receives the pin 24a of the lateral slider 24 (FIG. 2).

(Loading of a Disk)

On the bottom wall 57 of the chassis 5 (see FIG. 9), the recording and/or playing portion 3 and the magazine containing portion 2 are formed such that lower side of the recording and/or playing portion 3 is in the shape of a step which is higher than the lower side of the magazine containing portion 2. A loading mechanism 6 illustrated in FIGS. 9–13 is supported on a section on the step 57a of the bottom wall 57.

The loading mechanism 6 is construction so as to carry out a loading operation and an unloading operation which will be described below.

(Loading Operation)

A tray 12 supporting a disk 11 which has been selected at random out of a plurality of disks 11 in the magazine 1 contained in the magazine containing portion 2 is pulled out of the case 13 of the magazine 1 toward the recording and/or playing portion 3 and is moved to a loading position therein. Then the disk 11 on the tray 12 is lifted up to be clamped between a turntable 31 of the recording and/or playing portion 3 and a holder ring which is not illustrated. According to this embodiment, the disk 11 is moved by a distance which is less than its diameter. Therefore, a multi-disk player can be miniaturized compared with the one in which the disk 11 is pulled out by a distance corresponding to the diameter of the disk.

(Unloading Operation)

First a disk 11 is moved down and put on a tray 12 which is waiting in a loading position. The tray 12 and the disk 11 mounted thereon are moved out of the recording and/or playing portion 3 toward the magazine 1 and are returned to the original position therein.

Now a description will be given of a mechanism for moving the disk 11 in the front and rear directions (i.e., the directions in which the magazine 1 is inserted and pulled ut).

According to this embodiment, the loading mechanism 6 comprises a hook 61 which engages with a selected tray 12 in the magazine 1, and a driving means for moving the hook between a locking position and a shunting position. The driving means selectively moves the hook 61 to the locking position where the hook 61 can engage with the tray 12 or to the shunting position where the hook 61 does not engage with the tray 12. The driving means creates a straight drive which straightly reciprocates the hook 61 from the locking position to a position in which the disk 11 is to be loaded.

Furthermore, the shunting position is arranged on a side of the locking position. Among several methods to arrange a shunting position on the side of a loading position, where a hook is moved in parallel to a side of the loading position or where a hook is rotated around its one edge which is not projected, for example, the latter is employed in this embodiment. Because a shunting position and a locking position are partly overlapped in the method, the regional moving space for the hook can be made small.

Figure 9:
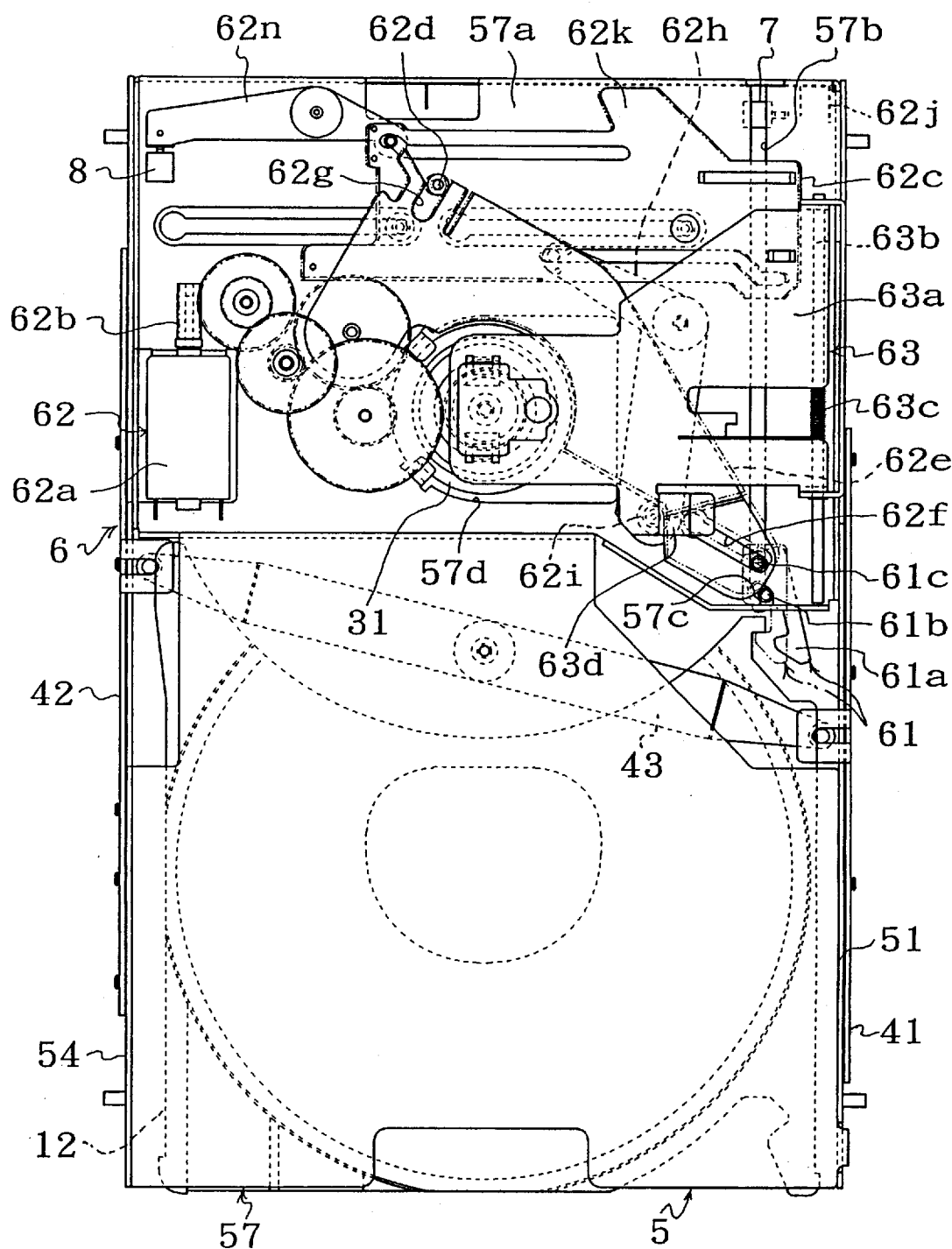
FIG. 9 is a bottom view of the multi-disk player according to the present invention.
Figure 10:
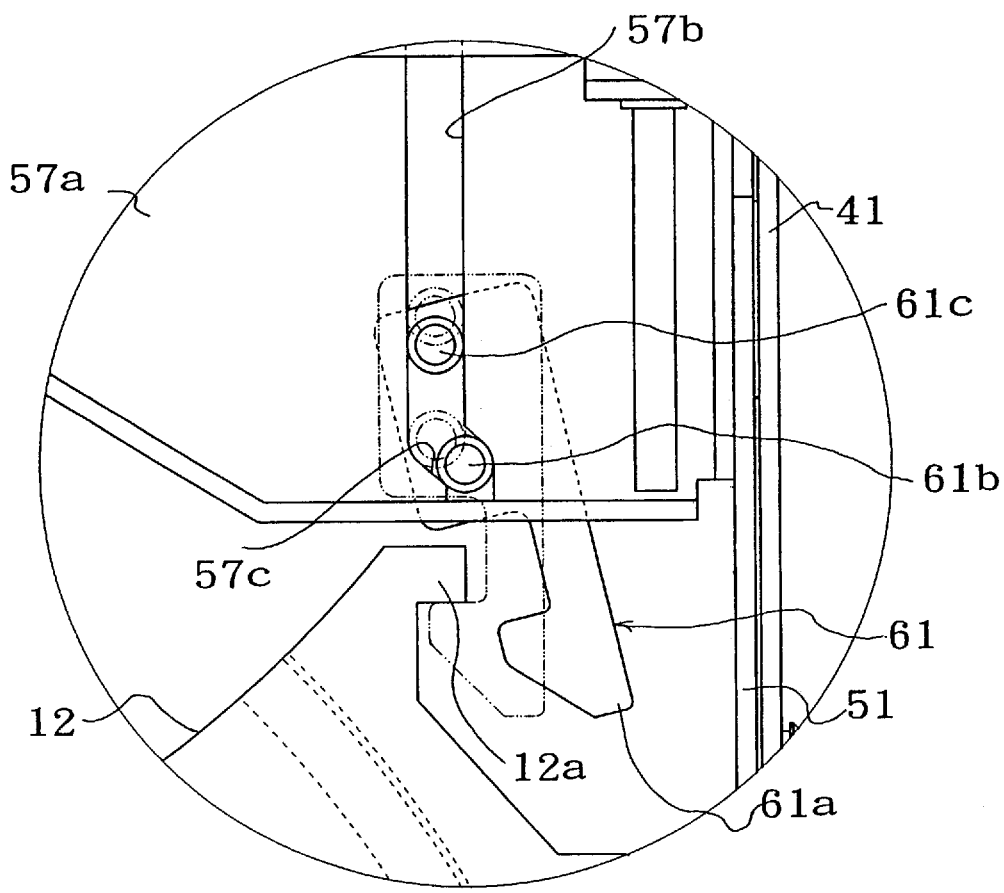
FIG. 10 is an enlarged bottom view of the principle part of a bottom wall of a chassis of the multi-disk player according to the present invention.

A slit-shaped longitudinal movement guiding groove 57b (FIG. 9) which extends forward and backward, and outside facing groove 57c which is connected to the front end portion of the longitudinal movement guiding groove 57b and extends to the left and outside, as shown in enlarged view of FIG. 10, are formed on left side part of the section on the step 57a.

As illustrated in FIGS. 9–13, the hook 61 which engages with a tray 12 is provided on the loading mechanism 6. The hook 61 comprises a hook body 61a and two, front and rear, projections 61b and 61c formed on the lower surface of the hook body 61a and slidably fit in the longitudinal movement guiding groove 57b.

A loading driving mechanism 62 comprises a loading motor 62a supported on the right side part of the lower surface of the section on the step 57a, a cam plate 62c interlocked with the loading motor 62a through reduction transmission mechanism 62b which is made up of a reduction gear train, for example, and a hook driving lever 62e which rotates around a longitudinal axis within a predetermined range of angles. The hook driving lever 62 is engages with a pin 62d which projects from the lower surface of the cam plate 62c.

Moreover, an elongated hole (hook engaging hole 62f) which is longer in a direction where the center of a lever rotating axis extends, is formed on a tip of the hook driving lever 62e. The rear projection 61c of the hook 61 is slidably and rotatably fit in the hook engaging hole 62f. The driving power of the loading motor 62a is transmitted to the hook driving lever 62e through the reduction transmission mechanism 62b and the cam plate 62c. When the hook driving lever 62e is driven, the hook 61 is guided through the longitudinal movement guiding groove 57b and the outside facing groove 57c.

Figure 12:
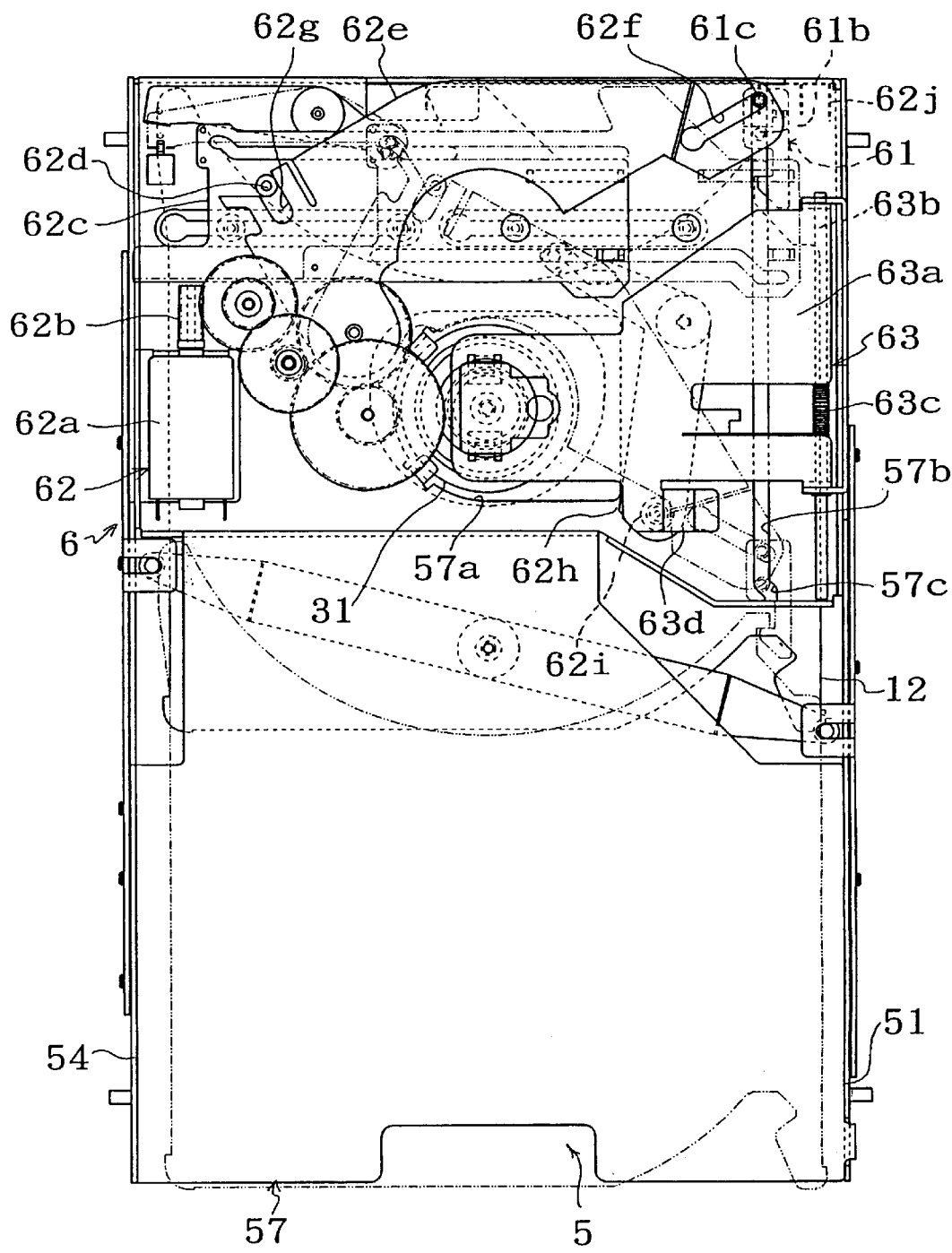
FIG. 12 is a bottom view of the multi-disk player according to the present invention.
Figure 13:
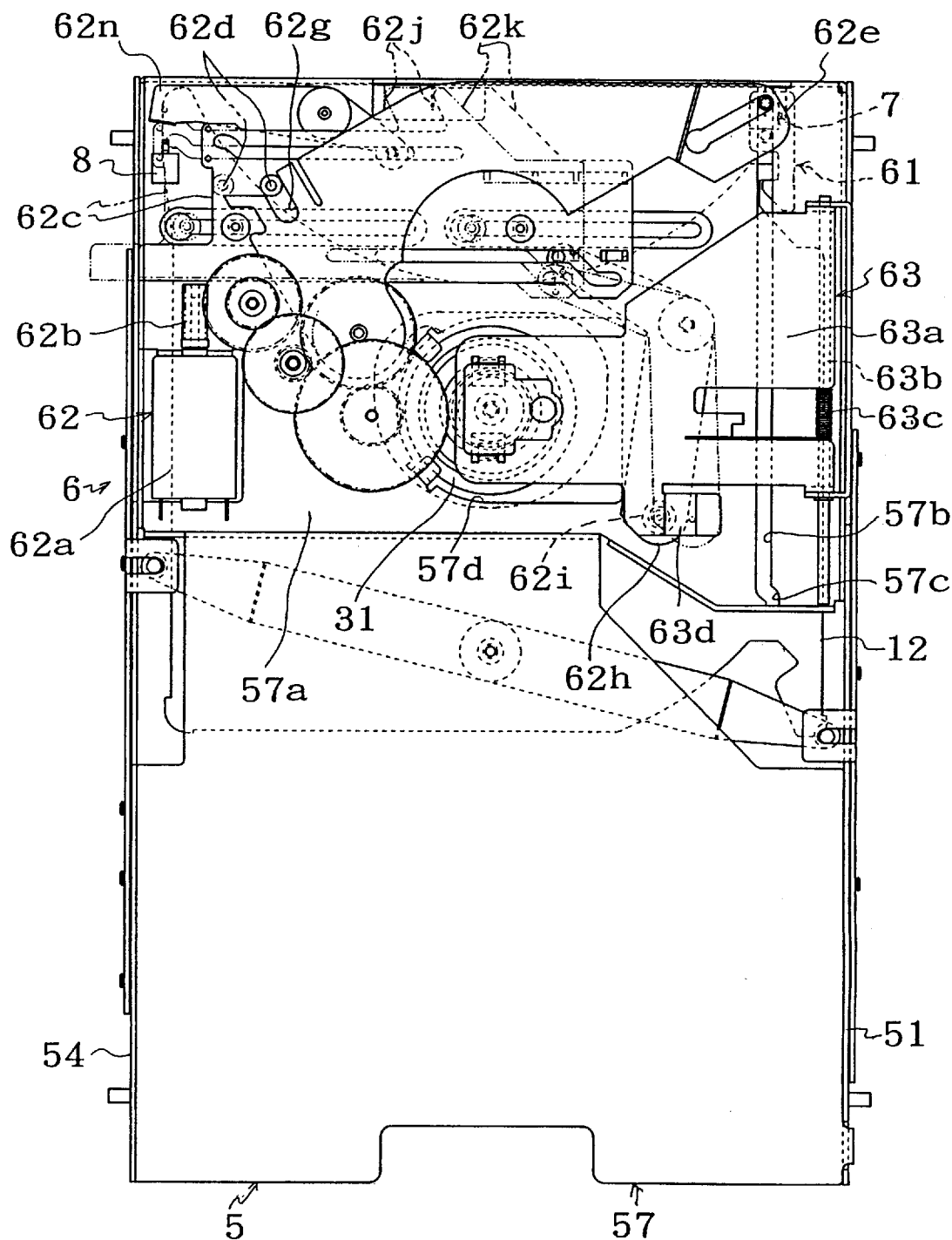
FIG. 13 is a bottom view of the multi-disk player according to the present invention.

The hook driving lever 62e is rotated from its initial position indicated with solid line and dotted line in FIG. 9 to its loading position indicted with solid line in FIGS. 12 and 13. In the initial position, the hook driving lever 62e pushes a front projection 61b of the hook 61 into the outside facing groove 57c, whereby the hook 61 is positioned in the shunting position, that is out of the space for movement of a tray 12 while the magazine is inserted or pulled out.

If the magazine 1 is inserted into the magazine containing portion 2 when the hook 61 is in its shunting position as above, the hook 61 does not prevent the tray 12 from moving backward, so that the magazine 1 can be inserted into the magazine containing portion 2.

When the magazine 1 is inserted into the magazine containing portion 2, the loading mechanism 6 is started, whereby the hook driving lever 62e and the cam plate 62c respectively begin to move from their initial positions to the loading positions. During the early stage of the movement, the front projection 61b of the hook 61 is pulled into the longitudinal movement guiding groove 57b from the outside facing groove 57c. Afterwards, as illustrated with a two-dot and dash line in FIGS. 9 and 12, an engaging claw 12a (see FIG. 10) formed on rear right section of the selected tray 12 is engaged by the hook 61 which comes from the outside from the right direction. The engaging claw 12a is formed at a position which is closer to the middle of the tray 12 than portion of the outer circumference of the tray 12 are to the middle of the tray and is aligned with a projection of the longitudinal movement guiding groove 57b (see FIG. 10).

When the hook driving lever 62e is moved toward the loading position, both the front and rear projections 61b and 61c of the hook 61 are guided through the longitudinal movement guiding groove 57b, the hook 61 is moved backward while still engaging the tray 12, and the disk 11 loaded on the tray 12 reaches the loading position in the recording and/or playing portion 3 indicated with solid line and dotted line, respectively, in FIGS. 12 and 13.

Furthermore, the cam plate 62c continues to move to the left from the loading position (indicated with a two-dot and dash line in FIG. 13), so as to cause the operation by which the disk 11 is clamped. While the cam plate 62c is moved from the loading position to the position to be clamped, the pin 62d leaves a cam engaging groove 62g on the hook driving lever 62e. Therefore, only the cam plate 62c moves from its loading position to its clamping position leaving the hook driving lever 62e in its loading position.

In the center part of the section on the step 57a, an insertion hole 57d is formed so that the turntable 31 can go up and down through it. On left end section of the step 57a there is provided an axis 63b which rotatably supports the clamp lever 63a of the clamping mechanism 63. The axis 63b extends in the forward and backward direction. The turntable 31 is supported on a tip of the clamp lever 63a, and is rotatable around the center of the longitudinal axis.

Furthermore, a clamp spring (torsion spring) 63c is supported ont he axis 63b. The clamp lever 63a is urged by the clamp spring 63c in a direction where a tip of the lever goes up.

Figure 11:
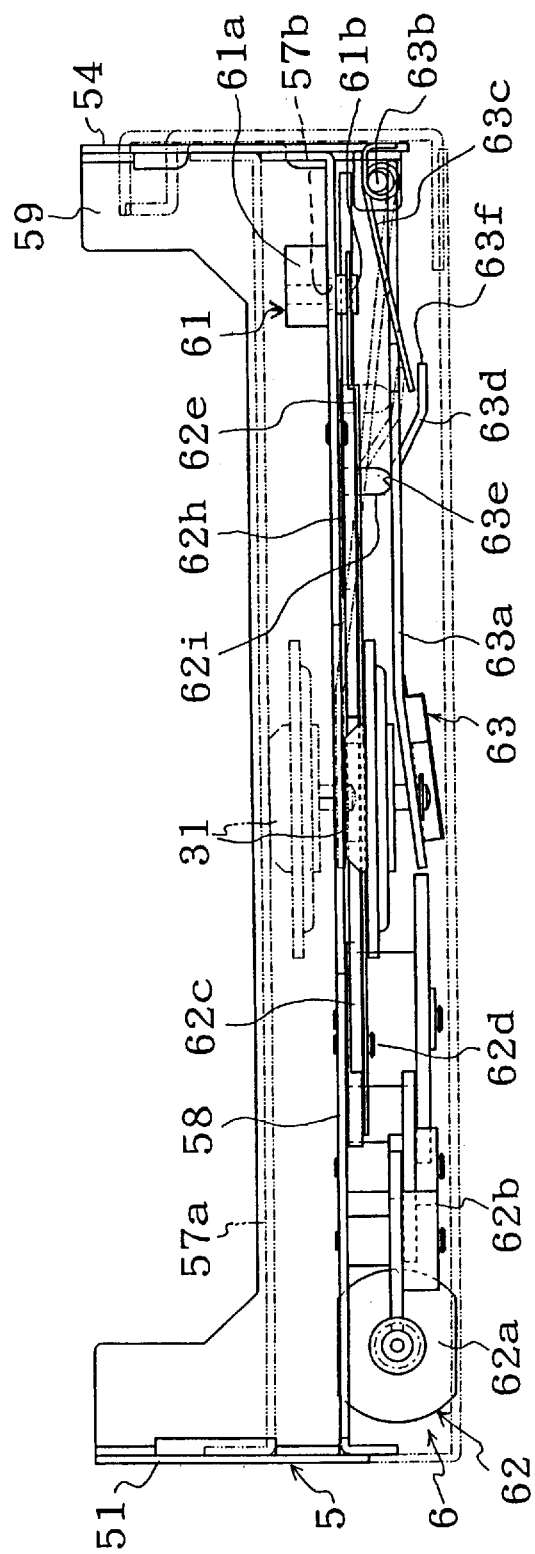
FIG. 11 is a front view of a loading mechanism of the multi-disk player according to the present invention.

As illustrated in FIG. 11, a clamp cam 63d is formed on an edge of front side of the middle section of the clamp lever 63a, such that the upper surface of the clamp cam 63d lowers on the right. The clamp cam 63d is received by a restriction means 62i which is fixed on a lower surface of a clamp driving lever 62h. The clamp driving lever 62h is driven by the cam plate 62c of the loading driving mechanism 62.

And as illustrated in FIGS. 11 and 13, the restriction means 62i is positioned above upper step portion 63e of the clamp cam 63d when the cam plate 62c is in the loading position, and positioned above lower step portion 63f of the clamp cam 63d when the cam plate 62c is in the clamping position.

Since the clamp lever 63a is urged by the clamp spring 63c wound around the axis 63b, in the direction where the turntable 31 rises, the clamp cam 63d is pressed against the restriction means 62i by the clamp spring 63c.

When the cam plate 62c is in the loading position, therefore, the turntable 31 is pushed down to the unclamping position that is lower than the section on the step 57a, as indicated with a solid line in FIG. 11. On the other hand, when the cam plate 62c is in the clamping position, the turntable 31 is pushed up to the clamping position that is higher than the section on the step 57a, as indicated with a two-dot and dash line in FIG. 11.

While the turntable 31 goes up from the unclamping position to the clamping position, a central portion of the turntable 31 enters a center part of the disk 11, the lower surface of the central unrecorded region of the disk 11 is received by the periphery of the turntable 31, and the disk 11 is lifted up from the tray 12 to a predetermined height keeping the condition, whereby the central unrecorded region of the disk 11 is clamped between holder ring (not illustrated) and the turntable 31.

According to this embodiment, the holder ring is moved up and down interlocked with the cam plate 62c in order to achieve accurate control of the height of the disk 11 when clamped between the turntable 31 and the holder ring, as well as to achieve a higher efficiency of friction transmission therebetween.

A driving and sensor driving slider 62j (FIG. 9) is supported on the rear wall of the chassis 5 and is slidable in the right and left directions, but is urged to the right by a return spring which is not illustrated. A slide driving portion 62k is formed on the rear edge of the cam plate 62c so as to project to the back. While the cam plate 62c moves from the loading position to the clamping position, the slider 62j is received by the driving portion 62k from the left.

Movement of the slider 62j is transmitted to the holder ring through an interlocking mechanism 62m (see FIG. 1). When the cam plate 62c is in the loading position, the holder ring is positioned higher than upper surface of the disk 11 which is mounted on the tray 12, by the return spring provided within the interlocking mechanism 62m. When the cam plate 62c moves from the loading position to the clamping position, on the other hand, the holder ring is lowered against the return spring to a predetermined height through the movement of the cam plate 62c, whereby the disk 11 is clamped.

Although not illustrated, guides for stabilizing reciprocation in the recording and/or playing portion 3 of the tray are formed on both the right and left sides of the space surrounded with the section on the step 57a of the chassis 5, a sub chassis 58, and the right and left walls 51 and 54.

Paying attention to the compositions of the driving means from locking position to the shunting position, a screw axis, linking mechanism, cam, or a combination of more than two of these can be used therein. In view of the development of the operating speed, a lever, linking mechanism, cam, or a combination of these should be advantageous.

Paying attention to the compositions of the driving means for making a straight drive, a screw axis, lever, linking mechanism, cam, or combination of more than two of these can be used therein. In view of the development of the operating speed of the driving means for making a straight drive, a lever, linking mechanism, cam or combination of these should be advantageous.

It is possible to form the locking and unlocking driving means and the driving means for making a straight drive independently of each other. However, in this embodiment, the loading driving mechanism 6 is constructed so as to have all of the functions of a locking and unlocking means, a driving means for making a straight drive, and a clamp driving means which drives clamping mechanism 63 for clamping the disk 11 to be recorded and/or played between the turntable 31 and the holder ring, whereby the number of parts in whole body can be reduced and a simple construction for lowering costs can be realized.

(Recording and/or Playing Operation)

As shown in FIG. 1, the spindle motor 32 of the recording and/or playing portion 3 and the sub chassis 58 which supports the optical head 33 and the tracking servo mechanism 34 are provided on the upper side of the section on the step 57a. And, as described above, the spindle motor 32 rotates when the disk 11 is clamped. When the spindle motor 32 rotates, the turntable 31 also rotates, and moreover, the disk 11 is rotated by the friction transmission. Afterwards, the recorded surface of the disk 11 is read (if the disk 11 is postscript type or can be rewritten, it is read and/or written) by moving the optical head 33 with the tracking servo mechanism 34 in the direction of the diameter of the disk 11, while rotating the disk 11.

Furthermore, according to this embodiment, a play sensor (for example, a micro switch) 7 is provided for detecting if recording and/or playing operations are going on. The play sensor 7 is driven by the slider 62j so as to be turned on (or off) when the slider 62j is in the clamping position.

(Unloading of Disks)

When the reading (or recording) of the disk 11 is finished, an unloading operation of the opposite order to the loading position is carried out, wherein the turntable 31 is lowered into the unclamping position, and the disk 11 is put down on the tray 12 which has been waiting in the loading position, and is accordingly moved from the loading position together with the tray 12 toward the magazine 1.

Since the pin 62d of the cam plate 62c is engaged with the cam engaging groove 62g of the hook driving lever 62e when it goes back to the loading position, the hook driving lever 62e is moved forward from the loading position. Accordingly, the disk 11 and the tray 12 are returned to their original position in the magazine 1 which is in the magazine containing portion 2.

And when the hook driving lever 62e moves to the initial position, the hook 61 leaves the engaging claw 12a of the tray 12, i.e., it leaves the locking position for the shunting position, whereby the tray 12 in the magazine 1 can be smoothly pulled out of the magazine containing portion 2 together with the case 13 and the disk 11, without being blocked by the hook 61.

Moreover, according to this embodiment, a standby sensor (for example, a micro switch) 8 is driven through the sensor driving lever 62n which is engaged with rear end section of the cam plate 62c, when the cam plate 62c of the loading mechanism 6 is moved to the initial position. Accordingly, it can be detected if the magazine 1 is capable of being pulled out.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A multi-disk player comprising:

a magazine having a plurality of trays stacked in a case, each of said trays being adapted to receive a disk;

a magazine containing portion of the player in which the magazine is adapted to be inserted and pulled out of the player in a particular direction;

a recording and/or playing portion of the player arranged to be aligned with the magazine containing portion in said particular direction;

an elevator mechanism to adjust relative locations of said recording and/or playing portion with the trays of the magazine being generally perpendicular to said particular direction; and a loading mechanism which reciprocates a tray holding a selected disk between the magazine, when contained in said magazine containing portion, and the recording and/or playing portion, said loading mechanism comprising:

a hook having a portion which engages with an engaging portion of the tray holding the selected disk in the magazine when contained in the magazine containing portion, a first projection and a second projection provided on the hook, a first guiding groove which guides said first projection so as to selectively guide the engaging portion of said hook between a locking position in which the engaging portion on a point of the hook engages with the engaging portion of said tray, and a shunting position in which the hook engaging portion does not engage with the engaging portion of said tray, a second guiding groove connected with the first guiding groove which guides said first projection and second projection so said hook is guided in a straight line from said locking position to a position in which said disk is loaded, and a driving means which moves said hook along said second guiding groove.

2. The multi-disk player according to claim 1 in which said engaging portion of the tray is positioned in a prolongation of said second guiding groove.

3. The multi-disk player according to claim 1 in which the loading mechanism is constructed so that when the selected disk is contained in the magazine containing portion, it is reciprocated between the magazine and the recording and/or playing portion by a distance less than a diameter of the selected disk.

4. The multi-disk player according to claim 1 in which a portion of the tray which is positioned above the selected disk moved into the recording and/or playing portion is cut away in a semi-circular shape.

5. A multi-disk player comprising:

a magazine having a plurality of trays stacked in a case, each of said trays adapted to receive a disk, and each of said trays having an engaging portion inward of a side edge of the tray;

a magazine containing portion of the player in which the magazine is adapted to be inserted and pulled out in a particular direction;

a recording and/or playing portion arranged to be aligned with the magazine containing portion in said particular direction;

an elevator mechanism which adjusts relative locations of the recording and/or playing portion with respect to said plurality of trays of the magazine, said elevator mechanism being generally perpendicular to said particular direction; and a loading mechanism which reciprocates a tray holding a selected disk between the magazine contained in said magazine containing portion and the player recording and/or playing portion, said loading mechanism comprising a hook having a portion which engages with said engaging portion of the tray holding the selected disk in the magazine when contained in the magazine containing portion, a driving means for moving said hook in the same plane between a locking position in which the hook engages with said engaging portion of said tray holding the selected disk and a shunting position in which said hook does not engage with the engaging portion of any of said plurality of trays, the area for the movement of said hook in the same plane between said locking and shunting positions being inward of the outer circumference of the tray, and a tray loading mechanism which reciprocates said hook in a straight line when in said locking position to move the tray engaged by said hook to a position in which the selected disk is to be loaded in the player.

6. The multi-disk player according to claim 5 in which said loading mechanism is constructed so that when the selected disk is contained in the magazine containing portion, it is reciprocated between the magazine and the recording and/or playing portion by a distance less than a diameter of the selected disk.

7. The multi-disk player according to claim 5 in which a portion of the tray which is positioned above the selected disk moved into the recording and/or playing portion is cut away in a semi-circular shape.

* * * * *

UNITED STATES PATENT AND TRADEMARK OFFICE
CERTIFICATE OF CORRECTION

PATENT NO. : 5,854,782
DATED : December 29, 1998
INVENTOR(S) : Tadanori TAMIYA et al.

It is certified that error appears in the above-identified patent and that said Letters Patent is hereby corrected as shown below:

On title page, item [73], Assignee change "SANYO ELECTRIC CO.LTD, TOTTORI, JAPAN" and "TOTTORI SANYO ELEC. CO. LTD, OSAKA-FU, JAPAN" to --SANYO ELECTRIC CO. LTD, OSAKA-FU, JAPAN--; TOTTORI SANYO ELEC. CO. LTD, TOTTORI, JAPAN--.

Signed and Sealed this

Fifth Day of October, 1999

Attest:

Q. TODD DICKINSON

*Attesting Officer*  *Acting Commissioner of Patents and Trademarks*